(12) United States Patent
Kovacs et al.

(10) Patent No.: US 7,506,327 B2
(45) Date of Patent: *Mar. 17, 2009

(54) SYSTEM AND METHOD FOR MANIPULATING AND AUTOMATICALLY UPDATING ENTERPRISE APPLICATION DEPLOYMENT DESCRIPTORS

(75) Inventors: Michael Kovacs, San Francisco, CA (US); Cédric Beust, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 857 days.

This patent is subject to a terminal disclaimer.

(21) Appl. No.: 10/772,626

(22) Filed: Feb. 5, 2004

(65) Prior Publication Data
US 2004/0158571 A1    Aug. 12, 2004

Related U.S. Application Data

(60) Provisional application No. 60/445,535, filed on Feb. 6, 2003, provisional application No. 60/445,532, filed on Feb. 6, 2003.

(51) Int. Cl.
*G06F 9/45* (2006.01)
(52) U.S. Cl. .................................................. 717/144
(58) Field of Classification Search ......... 717/101–102, 717/107, 118, 125, 170, 144; 709/230, 246; 707/10, 201, 1, 100–102; 714/38; 704/1
See application file for complete search history.

(56) References Cited

U.S. PATENT DOCUMENTS

| | | | |
|---|---|---|---|
| 5,845,120 A * | 12/1998 | Reddy et al. | 717/125 |
| 6,237,135 B1 | 5/2001 | Timbol | |
| 6,591,272 B1 * | 7/2003 | Williams | 707/102 |
| 6,643,652 B2 * | 11/2003 | Helgeson et al. | 707/10 |
| 6,721,747 B2 * | 4/2004 | Lipkin | 707/10 |
| 6,804,682 B1 | 10/2004 | Kemper et al. | |
| 6,912,710 B2 * | 6/2005 | Broussard et al. | 717/170 |
| 6,964,010 B1 * | 11/2005 | Sharp | 715/225 |
| 7,356,803 B2 | 4/2008 | Bau et al. | |
| 2003/0028364 A1 | 2/2003 | Chan et al. | |
| 2003/0060896 A9 * | 3/2003 | Hulai et al. | 700/1 |
| 2005/0021689 A1 | 1/2005 | Marvin et al. | |

OTHER PUBLICATIONS

WebLogic Server 6.1: Developing Weblogic Server J2EE Applications, Oct. 22, 2001, pp. 1-20 <http://web.archive.org/web/20011022014739/edocs.bea.com/wls/docs61/programming/environment.html>.*

* cited by examiner

*Primary Examiner*—Tuan Anh Vu
(74) *Attorney, Agent, or Firm*—Fliesler Meyer LLP

(57) ABSTRACT

A system and method for updating at least one deployment descriptor, comprising creating a first representation of the at least one deployment descriptor; creating a second representation of a second at least one deployment descriptor based on one or more source files; comparing the first representation with the second representation; updating the first representation based on the second representation if the first representation is out-of-date; and wherein the method can be invoked from an integrated development environment.

24 Claims, 3 Drawing Sheets

SYSTEM AND METHOD FOR MANIPULATING AND AUTOMATICALLY UPDATING ENTERPRISE APPLICATION DEPLOYMENT DESCRIPTORS

CLAIM OF PRIORITY

This application claims priority from the following applications which are hereby incorporated by reference in their entirety:

SYSTEM AND METHOD FOR MANIPULATING AND AUTOMATICALLY UPDATING ENTERPRISE APPLICATION DEPLOYMENT DESCRIPTORS, U.S. Application No. 60/445,535, Inventors: Michael Kovacs, et al., filed on Feb. 6, 2003.

SYSTEM AND METHOD FOR MANIPULATING ENTERPRISE APPLICATION DEPLOYMENT DESCRIPTORS, U.S. Application Ser. No. 60/445,532, Inventors: Michael Kovacs, et al., filed on Feb. 6, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

The following publication is hereby incorporated by reference in its entirety: BEA SYSTEMS, INC., *BEA WebLogic Server®: WebLogic Builder Online Help* (Release 7.0, June 2002).

FIELD OF THE DISCLOSURE

The present invention disclosure relates to tools for deploying web applications, and in particular, tools for manipulating web application deployment descriptors.

BACKGROUND

In order to deploy an application in a web server, configuration and run-time information must be provided to the web server via one or more deployment descriptor files. Such files can describe run-time parameters particular to a given web server implementation, configuration information for application objects including for example information pertaining to object persistence and relationships among objects. Deployment descriptor files are typically written extensible Markup Language (XML). Such files are often lengthy and cryptic which makes them difficult to decipher and edit by hand. Furthermore, the information contained in deployment descriptor files must be kept up-to-date to reflect changes in a corresponding application's source files. This arrangement invites error. For instance, unless users are vigilant when editing either application or deployment descriptor files, one will become unsynchronized with the other. The user may not even realize this until long after an application has been deployed in a web server. Furthermore, manually editing disparate files creates another opportunity for error due to input errors.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, an interactive tool (hereinafter referred to as "builder") allows a user to interactively edit information in deployment descriptors for an application without having to manually edit the underlying files. By way of a non-limiting example, a user can add a tag library to a web application, or add a finder method to an Entity JavaBean™ (EJB). The builder can allow the user to then test the deployment information by validating it and deploying the application to the server. If any of an application's deployment descriptor files are missing or defective, the builder can generate new or newly serviceable descriptor files. In one embodiment, the web server is the BEA WebLogic® Server from BEA Systems, Inc. of San Jose, Calif. In one embodiment, an application can include Java™ 2 Platform, Enterprise Edition (J2EE) components. Java™, JavaBeans and the J2EE platform are available from Sun Microsystems, Inc. of San Jose, Calif.

Figure 1:
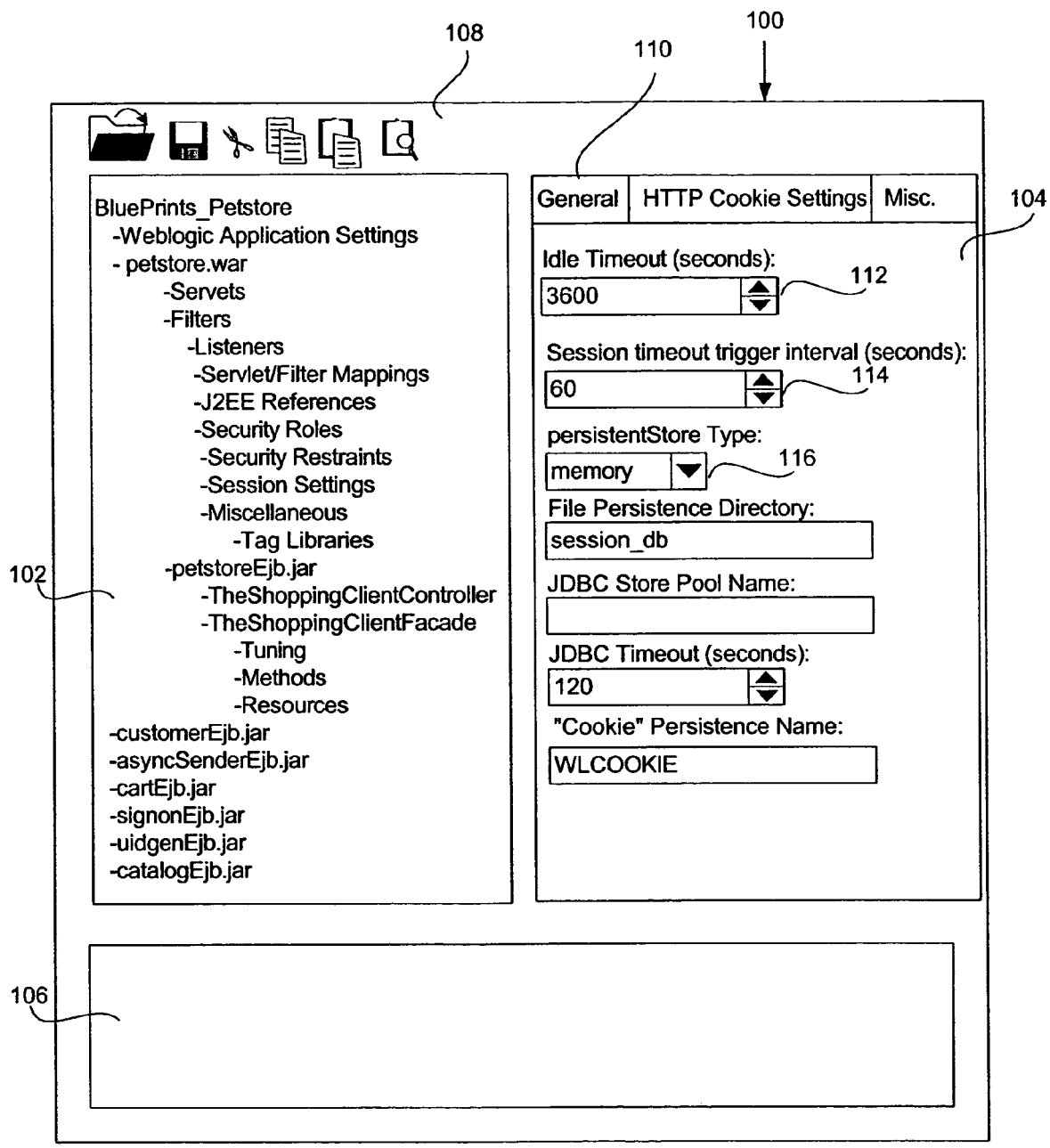
FIG. 1 is an exemplary Graphical User Interface (GUI) in one embodiment of the invention.

FIG. 1 is an exemplary Graphical User Interface (GUI) in one embodiment of the invention. In one embodiment and by way of illustration, the GUI can be implemented using Microsoft® Windows®, available from Microsoft Corporation of Redmond, Wash. It will be apparent to those of skill in the art that other embodiments based on other GUI frameworks are within the scope and spirit of this disclosure. GUI 100 can include user-selectable resource hierarchy 102, settings pane 104, message area 106, and tool bar 108. Message area 106 can be used to display messages of import to the user, such as the result of validating deployment descriptor information, messages from a web server, etc. In one embodiment, message area 106 can contain user-selectable text and/or graphics. By way of a non-limiting example, GUI user selection can be accomplished with a mouse, tablet, keyboard, voice command, gesture, etc. Tool bar 108 can include user-selectable controls for directing builder to load files, validate deployment descriptor information, update deployment descriptor information, and save deployment descriptor information.

In one embodiment, the builder organizes information from all of an application's deployment descriptors into a logical hierarchy of resources. Such a hierarchy hides the underlying complexity of the deployment descriptor files and makes it easier for users to access information by imposing an intuitive organization on the information. In one embodiment, this hierarchy can be represented graphically as resource hierarchy 102. In one embodiment, hierarchy 102 represents a high-level abstraction of any Java™ archive (JAR), Web Archive (WAR), Enterprise Archive (EAR), Java™ Connector Architecture Component (RAR), and/or an exploded Java™ Enterprise module (e.g., a source directory containing a "META-INF" subdirectory). This allows the user to view deployment information in terms of the organization of the application, rather than in terms of the foreign syntax of deployment descriptor files. By way of a non-limiting example, one such hierarchy could be organized as in FIG. 2.

Figure 2:
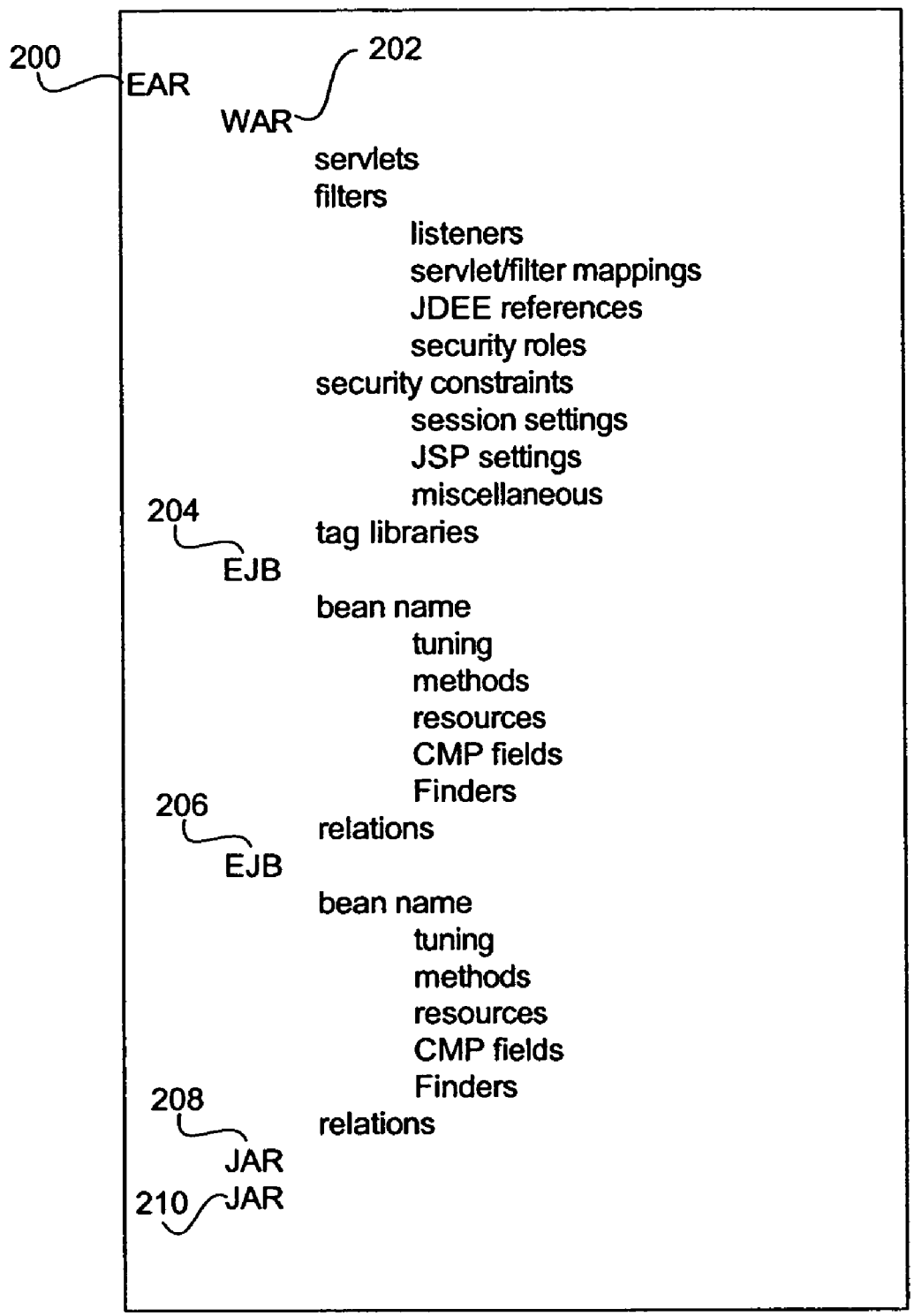
FIG. 2 is an exemplary resource hierarchy in one embodiment of the invention.

FIG. 2 is an exemplary resource hierarchy in one embodiment of the invention. Indented items in the figure are considered hierarchically inferior to less indented items. In one embodiment, and by way of a non-limiting example, the hierarchy 102 can include an EAR node 200 (corresponding to an EAR file). EAR node 200 can contain at least one WAR 202 node (corresponding to a WAR file), at least one EJB node (corresponding to an EJB file), and at least one JAR node 208-210 (each corresponding to a JAR file). WAR node 202 can include the following nodes: servlets, filters, security constraints and tag library. Each of these nodes may further contain other nodes, and so on. Continuing the example, EJB nodes 204 and 206 can each contain a bean name node and a relations node. The bean name node can contain the following nodes: turning, methods, resources, CMP fields, and finders. There is no limit to the number of nodes or hierarchical levels.

When a node in hierarchy 102 is selected (either by a user or programmatically), its associated deployment descriptor information is displayed in a format suitable for editing in settings pane 104. For example, the "Session Settings" node is selected in hierarchy 102. As such, settings pane 104 provides user-editable fields (e.g., 112-116) corresponding to deployment descriptor information this node. Although settings pane 104 may display a single field for a given value, that field may map to more than one value in more than one deployment descriptor file. Again, this complexity is hidden from the user. In one embodiment, mappings between fields and information in deployment descriptor files is disclosed in BEA SYSTEMS, INC., *BEA WebLogic Server®: WebLogic Builder Online Help* (Release 7.0, June 2002) which is incorporated by reference in its entirety. Settings pane 104 can include multiple panes, if necessary, each accessible by a user-selectable tab 110, button or other navigation mechanism. In another embodiment, default values for fields can be provided where reasonable.

Figure 3:
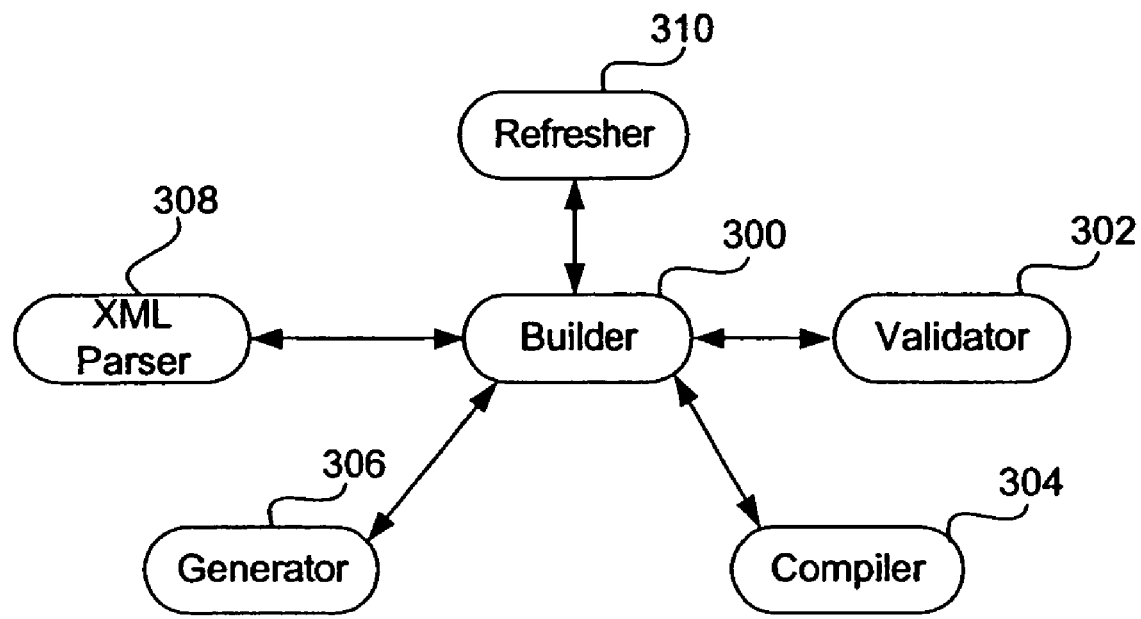
FIG. 3 is an exemplary system diagram in one embodiment of the invention.

FIG. 3 is an exemplary system diagram in one embodiment of the invention. Although this diagram depicts objects as functionally separate, such depiction is merely for illustrative purposes. It will be apparent to those skilled in the art that the objects portrayed in FIG. 3 can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by a network.

In one embodiment, builder 300 can coordinate the activities of the other components in conjunction with GUI 100. On start up and/or when a user directs GUI 100 to open a source file (e.g., via tool bar 108), builder can invoke XML parser 308 to parse deployment descriptor files for an application and create a data structure (hereinafter referred to as "dtree") representation there from. There are many commercial and publicly available XML parsers. However, the embodiments disclosed herein are not dependent on a particular XML parser or its resulting data structure representation of an XML document. In one embodiment, the dtree can be a tree data structure that embodies the hierarchical relationships of nested XML statements. When a user directs the GUI 100 to open an application module, XML parser 308 processes any corresponding deployment descriptor files and provides the resulting dtree to builder 300. Hierarchy 102 can then be constructed from the dtree by mapping the dtree's elements to node types in hierarchy 102.

If any deployment descriptor files needed for deployment of an application on a web server are missing or defective, builder 300 can generate new descriptor files by invoking deployment descriptor generator 306 to process application modules (e.g., Java™ source files). Generator 306 creates a dtree based on source files it discovers in an application's project directory or an archive file. Builder 300 can then take this dtree and use it to emit a set of deployment descriptor files. In one embodiment, generator 306 examines the contents of a staging directory and builds standard J2EE (e.g., web.xml and ejb-jar.xml) and server-specific deployment descriptors based on the servlet classes and EJB classes found therein. In one embodiment, deployment descriptor generator 306 is the ddinit tool available with the BEA WebLogic® Server from BEA Systems, Inc.

A user can direct builder (e.g., via toolbar 108) to validate the deployment descriptor information represented by hierarchy 102. In one embodiment, builder invokes validator 302 to locate errors within deployment descriptor files (e.g., incorrect CMP field name, etc.). Validator 302 directs compiler 304 to perform the validation. In one embodiment, compiler 304 is the ejbc tool available with the BEA WebLogic® Server from BEA Systems, Inc. In one embodiment, when compiler 304 determines that there is an error in an deployment descriptor file, it can create an Error object to store an error code and/or message, the identifier of a node and corresponding field in the resource hierarchy 102 to which the error pertains, and/or an XML type of the field. In one embodiment, compiler 304 provides an Error object to validator 302 for each error it encounters pertaining to deployment descriptor information. Error objects can be used to automatically navigate hierarchy 102 and settings pane 104 to the source of errors.

In one embodiment, validator 302 and/or compiler 304 can display human-readable error messages corresponding to each error object in message area 106. If a user selects such message, validator 302 using information in the associated Error object can cause the hierarchy 102 node identified by Error object to be automatically selected. In addition, validator 302 can cause the node's field(s) to be displayed in pane 104. In a further embodiment, the field which is the source of the error message can be highlighted in pane 104. In another embodiment, validator 302 can offer suggestions to the user for correcting the field value via a pop-up window or some other notification means.

In one embodiment, a user can direct builder (e.g., via toolbar 108) to deploy an application in a web server. The deploy button can cause compiler 304 to compile all of the source code associated with a specified project directory or JAR file. If no errors are detected, compiler 304 can place the EJB classes, interfaces, and deployment descriptor files in a JAR file, generate web server container classes for the Entity JavaBeans™, create client-side dynamic proxies and server-side byte code, and deploy the project to the web server.

In one embodiment, a user can direct builder 300 (e.g., via toolbar 108) to update an application's deployment descriptor information to take into account changes made to application source files. In another embodiment, builder 300 can automatically update the deployment descriptor information if it determines that application source files have been modified. In one embodiment, builder 300 can invoke XML parser 308 to create a master dtree (if one does not already exist) representing the present state of the deployment descriptor files, and can invoke generator 306 to create a new dtree representing deployment descriptor information based on the current state of source files in an application's project directory.

Builder 300 compares the master and new dtrees to each other. In one embodiment, for the portions of the dtrees that represent an EAR resource, builder 300 removes all modules contained within the EAR resource (e.g., WARs & JARs) in the master dtree that do not also exist in the new dtree. In addition, builder 300 adds modules to the master dtree if they exist in the new dtree but not in the master dtree. In this fashion, the master dtree is "refreshed" based on the current state of the project files. For the portions of the dtrees that represent EJBs, builder 300 can alter the master dtree so that it has the same bean resources as the new tree. For portions of the dtrees that represent WARs, builder 300 alters the master dtree so that it has the same modules (e.g., servlets, listeners, filters, tag libraries, etc.) as the new tree. In one embodiment, builder 300 does not delete modules from the master dtree WAR resources since other applications outside of the current application may depend on the deployment descriptors. In this way, changes made to application source code files can be integrated while preserving changes made to the DD's by a builder user. Finally, builder 300 can generate new deployment descriptors from the "refreshed" master dtree.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer based system for automatically maintaining at least one deployment descriptor, comprising at least one computer and:
   a parser operable to generate a representation of the at least one deployment descriptor;
   a generator operable to create the at least one deployment descriptor;
   a validator operable to validate the at least one deployment descriptor;
   a graphical user interface (GUI) operable to at least invoke the parser;
   wherein the GUI can include a user-selectable resource hierarchy, settings pane, message area, and toolbar and wherein when a node in the user-selectable resource hierarchy is selected, displaying at least one field in the GUI;
   wherein the at least one field corresponds to a plurality of values in a plurality of deployment descriptor files;
   wherein the system automatically generates a replacement deployment descriptor based on at least one application source code file associated with the at least one deployment descriptor if the at least one deployment descriptor is defective; and
   wherein the system is operable to automatically deploy an application associated with the at least one deployment descriptor;
   wherein the validator is further operable to
      generate an error when it encounters a syntactic or semantic fault in the at least one deployment descriptor's file,
      use the GUI to display an error message to a user, the message being selectable by the user,
      match the node corresponding to the error in the selectable message in response to the user's selection of the message,
      cause the fields of said node to be highlighted in the resource hierarchy, and
      display a notification to the user in the GUI wherein the notification includes suggestions for the user to correct said fields.

2. The computer based system of claim 1 wherein:
   the generator is further operable to produce the at least one deployment descriptor from at least one application source code file.

3. The computer based system of claim 1, further comprising:
   a builder component operable to automatically update the at least one deployment descriptor to reflect one or more changes in at least one application source code file.

4. The computer based system of claim 1 wherein:
   the representation can include information pertaining to at least one of: a Java™ archive (JAR), a Web Archive (WAR), an Enterprise Archive (EAR), and a Java™ Connector Architecture Component (RAR).

5. The computer based system of claim 1 wherein:
   the at least one deployment descriptor can be expressed as an Extensible Markup Language document.

6. A computer based system for automatically maintaining at least one deployment descriptor, comprising at least one computer and:
   a parser operable to generate a first representation of the at least one deployment descriptor's file;

a generator operable to create a second representation of deployment descriptor information based on at least one application source code file associated with the at least one deployment descriptor;

a graphical user interface (GUI) operable to at least invoke the parser;

wherein the GUI can include a user-selectable resource hierarchy, settings pane, message area, and toolbar and wherein when a node in the user-selectable resource hierarchy is selected, displaying at least one field in the GUI;

wherein the at least one field corresponds to a plurality of values in a plurality of deployment descriptor files;

a validator operable to validate the at least one deployment descriptor and further operable to
generate an error when it encounters a syntactic or semantic fault in the at least one deployment descriptor's file,
use the GUI to display an error message to a user, the message being selectable by the user,
match the node corresponding to the error in the selectable message in response to the user's selection of the message,
cause the fields of said node to be highlighted in the resource hierarchy, and
display a notification to the user in the GUI wherein the notification includes suggestions for the user to correct said fields;

a builder operable to compare the first representation with the second representation;

wherein the builder automatically updates the first representation to create an updated first representation based on the second representation if the builder determines that the at least one application source code file of the second representation has been modified;

wherein the system is operable to automatically generate a replacement deployment descriptor based on the at least one application source code file if the at least one deployment descriptor is defective; and wherein the system generates new deployment descriptors from the updated first representation.

7. The computer based system of claim 6 wherein:
the generator is operable to produce the at least one deployment descriptor from the at least one application source code file.

8. The computer based system of claim 6 wherein:
a representation can include information pertaining to at least one of: a Java™ archive (JAR), a Web Archive (WAR), an Enterprise Archive (EAR), and a Java™ Connector Architecture Component (RAR).

9. The computer based system of claim 6 wherein:
the at least one deployment descriptor can be expressed as an Extensible Markup Language document.

10. The computer based system of claim 6 wherein:
information is not deleted from the first representation after the first representation is updated.

11. The computer based system of claim 6 wherein:
information in the second representation that is not in the first representation is added to the first representation.

12. The computer based system of claim 6 wherein:
a user can modify information in the second representation.

13. A method for updating at least one deployment descriptor, comprising:
providing a graphical user interface (GUI) wherein the GUI can include a user-selectable resource hierarchy, settings pane, message area, and toolbar and wherein when a node in the user-selectable resource hierarchy is selected, displaying at least one field in the GUI;
wherein the at least one field corresponds to a plurality of values in a plurality of deployment descriptor files;
creating a first representation of the at least one deployment descriptor's file;
creating a second representation of deployment descriptor information based on at least one application source code file associated with the at least one deployment descriptor;
comparing the first representation with the second representation; and
automatically updating the first representation to create an updated first representation based on the second representation if the at least one application source code file of the second representation has been modified;
generating new deployment descriptors from the updated first representation; and
validating the at least one deployment descriptor by a validator, wherein the validator is further operable to
generate an error when it encounters a syntactic or semantic fault in the at least one deployment descriptor's file,
use the GUI to display an error message to a user, the message being selectable by the user,
match the node corresponding to the error in the selectable message in response to the user's selection of the message,
cause the fields of said node to be highlighted in the resource hierarchy, and
display a notification to the user in the GUI wherein the notification includes suggestions for the user to correct said fields.

14. The method of claim 13 wherein:
the at least one deployment descriptor can include information pertaining to at least one of: a Java™ archive (JAR), a Web Archive (WAR), an Enterprise Archive (EAR), and a Java™ Connector Architecture Component (RAR).

15. The method of claim 13 wherein:
the at least one deployment descriptor can be expressed as an Extensible Markup Language document.

16. The method of claim 13 wherein:
information is not deleted from the first representation after the first representation is updated.

17. The method of claim 13 wherein:
information in the second representation that is not in the first representation is added to the first representation.

18. The method of claim 13 wherein:
a user can modify information in the second representation.

19. A machine readable medium having instructions stored thereon that when executed by a processor cause a system to:
provide a graphical user interface (GUI) wherein the GUI can include a user-selectable resource hierarchy, settings pane, message area, and toolbar and wherein when a node in the user-selectable resource hierarchy is selected, displaying at least one field in the GUI;
wherein the at least one field corresponds to a plurality of values in a plurality of deployment descriptor files;
create a first representation of at least one deployment descriptor's file;
create a second representation of deployment descriptor information based on at least one application source code file associated with the at least one deployment descriptor;
compare the first representation with the second representation;

automatically update the first representation to create an updated first representation based on the second representation if the at least one application source code file of the second representation has been modified; and generating new deployment descriptors from the updated first representation; and validating the at least one deployment descriptor by a validator, wherein the validator is further operable to
- generate an error when it encounters a syntactic or semantic fault in the at least one deployment descriptor's file,
- use the GUI to display an error message to a user, the message being selectable by the user,
- match the node corresponding to the error in the selectable message in response to the user's selection of the message,
- cause the fields of said node to be highlighted in the resource hierarchy, and
- display a notification to the user in the GUI wherein the notification includes suggestions for the user to correct said fields.

20. The machine readable medium of claim 19 wherein:

the at least one deployment descriptor can include information pertaining to at least one of: a Java™ archive (JAR), a Web Archive (WAR), an Enterprise Archive (EAR), and a Java™ Connector Architecture Component (RAR).

21. The machine readable medium of claim 19 wherein:

the at least one deployment descriptor can be expressed as an Extensible Markup Language document.

22. The machine readable medium of claim 19 wherein:

information is not deleted from the first representation after the first representation is updated.

23. The machine readable medium of claim 19 wherein:

information in the second representation that is not in the first representation is added to the first representation.

24. The machine readable medium of claim 19 wherein:

a user can modify information in the second representation.

* * * * *